Dec. 30, 1958   A. W. BLAZIER   2,866,435
BIRD FEEDER
Filed May 3, 1956   2 Sheets-Sheet 2
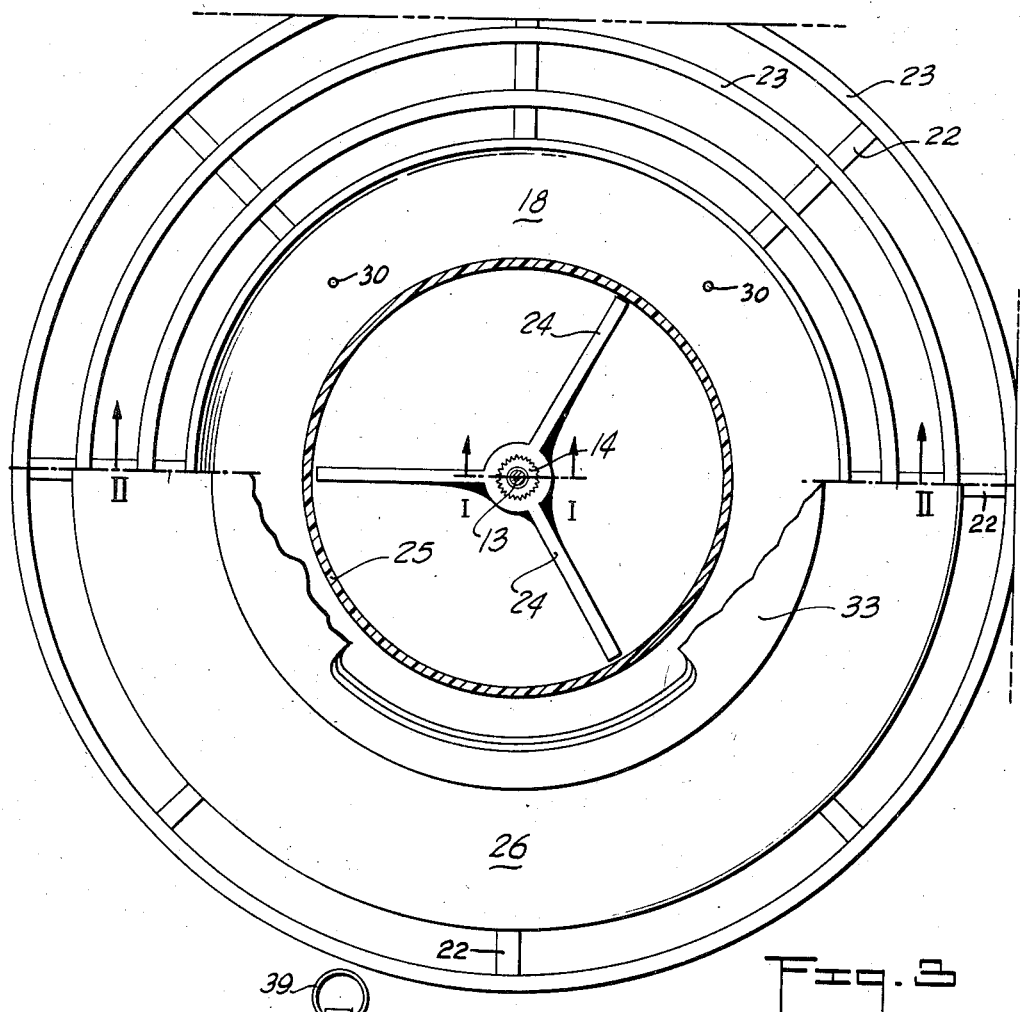
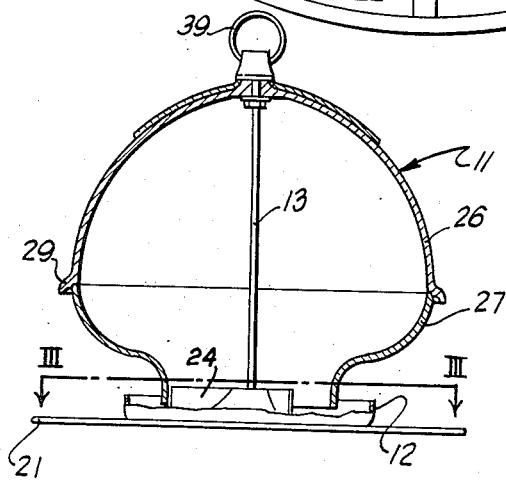
INVENTOR.
ARTHUR W. BLAZIER
BY
Towson Price
ATTORNEY United States Patent Office 2,866,435
Patented Dec. 30, 1958

2,866,435

BIRD FEEDER

Arthur W. Blazier, Montclair, N. J.

Application May 3, 1956, Serial No. 582,416

9 Claims. (Cl. 119—53)

This invention relates to improvements in bird feeders and, more particularly, to such for feeding wild birds, while excluding rodents such as squirrels and the like.

The present bird feeder involves a self-replenishing feeding tray and is desirably made of a hard substance such as transparent plastic, glass, metal, or a combination of such materials. It is my intention to produce a wild bird feeder with an open feeding tray, that is, one without any mesh protection across the top, and no discs or other baffles above or below the feeder to make it squirrel-proof when supported above the ground. I prefer to use a circular feeding tray with a tapered or generally conical portion in the center to direct the seed or other feed toward the outer part of the tray, defined by an upstanding preferably cylindrical flange.

I prefer to use an adjustable feeding tray and a container of generally global shape sustained in a vertical position at a controlled height above said tray, with the bottom portion or flare of the globe not on the same vertical circumference with the top portion or flare, but at a smaller radius. The upper portion of the globe is formed with a lower edge portion extending over the top and beyond the outside edge of the feeding tray. Such a feeder is squirrel-proof when the tray is adjusted so that the opening between the bottom portion of the globe and the top of the flange defining the outer periphery of the tray is smaller than the squirrel's head, providing the feeder is suspended or otherwise supported at least a short distance above the ground, so that the squirrel cannot get a footing for pulling the feed out with its paws.

An object of the invention is to provide a self-replenishing feeding tray for wild birds, in which the feed-holding tray is open, that is, without mesh portection over its top, and no discs or other baffles are used above or below the tray to repel squirrels or other rodents.

Another object of my invention is to provide a bird feeder having a circular tray with a central boss the sides of which slope toward the bottom in generally conical fashion to direct feed to the edge defined by an upstanding cylindrical flange.

A further object of my invention is to provide a bird feeder having a seed holder of generally global form, but in which the upper portion, while generally semi-spherical, is connected to a lower portion which is not a true hemisphere but flattened along its vertical axis to about the shape of an oblate spheroid, in order to facilitate the exclusion of squirrels and the like by the use of a metal rod for adjusting its position with respect to a feeding tray therebeneath.

A still further object of my invention is to provide a tray for feeding wild birds in combination with a seed holder disposed thereabove, in which the feeding tray has upstanding radial partitions or fins received in a cylindrical flange depending from said holder, so that if the seed tends to stick or clog, relative rotation breaks up and releases it to flow into the tray.

An additional object of my invention is to provide a wild bird feeder desirably formed of hard transparent plastic, such as cellulose acetate, and provided with a seed-holding portion in the general shape of an oblate spheroid having a filler opening at its top closed by a cover which rotates about a vertical axis, to either close said opening or expose it, and a rain-shedding flange projecting from its equatorial circumference.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 2 is a partial vertical sectional view on the line II—II of Figure 3 of the parts after assembly and to a scale smaller than that of Figure 1.

Figure 3 is a partial plan and partial horizontal sectional view on the line III—III of Figure 1, with the parts in the full line position, in the direction of the arrows.

Figure 1:
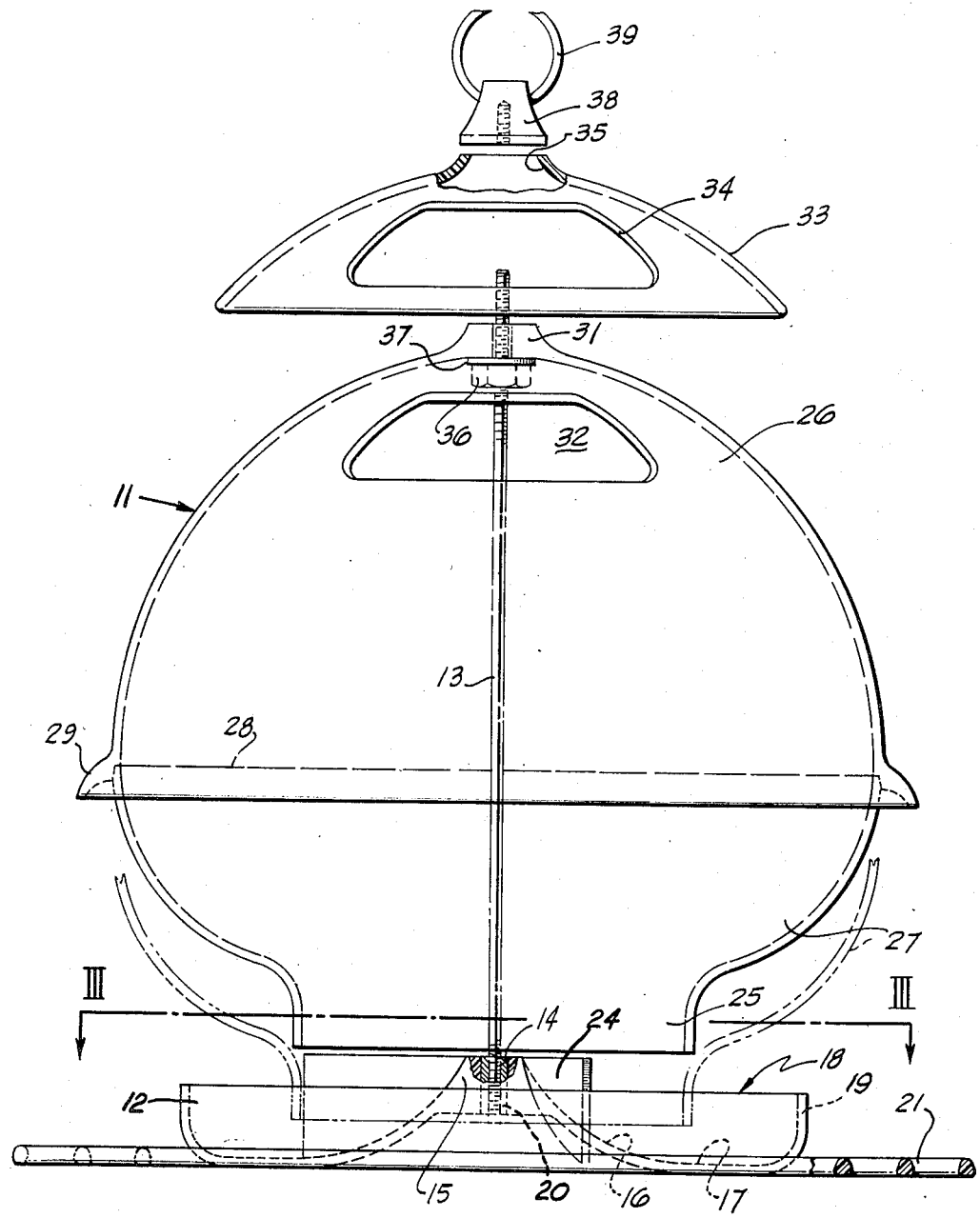
Figure 1 is an exploded view, with parts in elevation and parts in axial section, that is, on the line I—I of Figure 3, in the direction of the arrows.

Referring to the drawings in detail, the present embodiment of my bird feeder consists of a generally globular seed container or holder 11, a combined base and feeding pan 12, and a rod 13 for holding these parts in adjusted relationship with respect to one another. The rod 13 is threaded at its lower end, as indicated at 20, and adjustably received in an internally threaded portion or bushing 14 at the central upstanding boss portion 15 of the combined base and feeding pan 12. If, as preferred, the feeder is formed of hard transparent plastic such as cellulose acetate, the portion 14 may be of metal, desirably non-rusting, as an insert or bushing embedded in the central upstanding boss portion 15 of said combined base and pan 12.

The member 12 desirably consists of the circular boss portion 15, the sides of which slope as indicated at 16 to the floor or bottom surface 17 of the feeding pan portion 18. This pan portion is defined at its periphery by an upstanding preferably cylindrical wall or flange 19, from the outer surface of the lower portion of which extends a perch portion 21. This perch portion may consist of a plurality of arms 22 radiating from the flange 19 and carrying one or more circular perches 23, concentric with respect to the pan portion 18.

In addition to the sloping feed-directing sides of the boss 15, said boss is provided with a plurality of fins or flanges 24 radiating therefrom and, in the present embodiment, shown as three in number. These flanges 24, which also upstand from the pan portion 18, are closely received in the lower or depending generally cylindrical flange portion 25 of the seed container 11, when the latter is in the dotted line position of Figure 1, so that the relative rotation between said container 11 and the combined base and pan 18, about the rod 13 which connects these members, results in stirring the contents of the container and thus facilitates the flow thereof into the pan.

The container 11 comprises an upper generally-hemispherical portion 26 and a lower generally-oblate spheroid portion 27 connected together at about the equatorial meeting plane 28 in any desired manner, as by means of a suitable adhesive or by being formed integral with one another. The upper portion 26 has its lower edge extended to a larger diameter than the meeting edge of the lower portion 27, to provide eaves in the form of an outstanding peripheral flange 29 sloping downwardly and outwardly to direct rain and prevent it from running down along the outer surface of the lower portion 27 and into the feed pan. This seed container 11 has an upper apertured hub portion 31 non-threadably receiving the upper end of the support rod 13.

The container 11 also has a relatively large opening 32 for receiving seed or other feed to replenish the supply therein. This opening 32 is normally closed by a cover member 33. The latter has an opening 34, preferably the same size as the opening 32, and an upper opening 35 fitting the hub 31, so that the cover is rotatable thereabout to either cover the container opening 32 or expose it. The rod carries a nut 36 and desirably also a washer 37 on which is supported the holder 11 in adjusted position.

The parts may be assembled from the exploded positions of Figure 1 to that of Figure 2, by threading the rod 13 into the bushing 14, and applying the nut 36 and washer 37 on the upper end of the rod 13, the container 11 over the rod, and the cover 33 over the rod and the top of the container. The projecting upper end of the rod then has applied thereto a lifter nut 38, desirably supplied with a ring 39 which may be manually grasped for transporting the feeder. The lower end of the rod 13 is turned into or out of the receiving bushing or internal threads 14, as by rotating the member 12 thereabout, after the parts have been assembled, until the space between the flange 19 and the adjacent curved portion of the container 11 thereabove is so small that a squirrel cannot get its head therebetween, while not too small to prevent birds from getting feed therefrom.

In addition to the function of the fins or partitions 24 for breaking up and releasing bird seed or other feed which, especially in damp weather, might clog the relatively narrow opening at the bottom of the holder 11, they also prevent the base and pan 12 from being turned by wind, blowing differentially on the arms 22, for example, by providing the necessary drag between the parts. Small holes are desirably made in the bottom of the feeding tray to drain off any water which might get thereinto, as by being blown in during a rainstorm.

From the foregoing disclosure, it will be seen that I have produced a new and improved bird feeder in which a controlled or adjustable opening is provided between the top of the feeding tray and the bottom of the seed holder for excluding undesired animals.

The embodiment of my invention herein particularly shown and described is intended to be illustrative and not limitative of my invention since the same is subject to changes and modifications without departure from the scope of my invention, which I endeavor to express according to the following claims.

I claim:

1. A device for holding feed for birds and the like, comprising a combined base and feeding pan, said pan being defined by an upstanding peripheral edge portion and a central feed-supporting surface, a perch thereabout, a central boss, a plurality of fins upstanding from said boss, a seed holder with a cylindrical flange depending from its lower end and closely telescoping over said fins, and a rod with its lower end received in said boss, said seed holder having an upper aperture receiving the upper end portion of said rod to form a support for said device.

2. The invention as defined in claim 1, wherein the boss has sides sloping outwardly and downwardly from the central portion of said boss toward the peripheral edge portion of the pan.

3. The invention as defined in claim 2, wherein said fins upstand from said sloping sides of the boss.

4. The invention as defined in claim 1, wherein said boss is threaded about a vertical axis and the lower end of said rod is correspondingly threaded and adjustably received in said boss.

5. The invention as defined in claim 1, wherein there is a supporting nut threadable on the top end portion of said rod and engageable with the seed holder to support the device and hold the parts assembled.

6. The invention as defined in claim 1, wherein the seed holder has its upper portion extended to a larger diameter than its lower portion to provide rain shedding eaves.

7. The invention as defined in claim 1, wherein said seed holder comprises an upper portion and a lower portion, said lower portion being of smaller diameter in vertical planes than said upper portion so as to recede more quickly toward its vertical axis than the said upper portion, whereby the distance between the top of the peripheral edge portion of the pan and the adjacent portion of the seed holder may be adjusted to one less than the size of a rodent's head but still large enough to allow a bird to get seed from the pan.

8. The invention as defined in claim 1, wherein the seed holder has a filler opening, a cover member conforming in shape with said holder and having a filler opening corresponding in size to that of the seed holder filler opening, a supporting nut threaded on said rod adjacent to its upper end, and the seed holder has an upper hub apertured to receive the top end portion of said rod so as to be supported in adjusted position on said nut, said cover being formed with an inner rim defining an aperture receiving said hub, whereby it is rotatable thereabout to open or close the filler opening in the holder, and means threadable on the top end of said rod and engageable with the said holder cover rim thereabout.

9. The invention as defined in claim 1, wherein the said holder is made of hard, transparent plastic material, the lower end portion of the rod is formed with external threads, and a metal bushing is embedded in said boss and carries corresponding internal threads for receiving the lower end portion of said rod.

References Cited in the file of this patent

UNITED STATES PATENTS

| | | |
|---|---|---|
| D. 165,628 | Blazier | Jan. 8, 1952 |
| 216,651 | Bowen | June 17, 1879 |
| 546,526 | Greene | Sept. 17, 1895 |
| 2,475,207 | Smith | July 5, 1949 |
| 2,512,260 | Powell | June 20, 1950 |